United States Patent [19]

Haubner et al.

[11] 4,287,565

[45] Sep. 1, 1981

[54] MONITORING SYSTEM FOR PROGRAM CONTROLLED APPARATUS

[75] Inventors: Georg Haubner, Berg; Jürgen Wesemeyer, Nurenberg; Hans Schrumpf, Oberasbach; Jörg Birmelin, Bretten; Manfred Schwab, Gerlingen; Günter Hönig, Ditzingen; Uwe Kiencke, Ludwigsburg; Alfred Schulz, Oberriexingen; Werner Meier, Rednitzhembach, all of Fed. Rep. of Germany

[73] Assignee: Robert Bosch GmbH, Stuttgart, Fed. Rep. of Germany

[21] Appl. No.: 80,520

[22] Filed: Oct. 1, 1979

[30] Foreign Application Priority Data

Sep. 29, 1978 [DE] Fed. Rep. of Germany ....... 2842392
Jan. 31, 1979 [DE] Fed. Rep. of Germany ....... 2903638

[51] Int. Cl.³ .............................................. G06F 11/04

[52] U.S. Cl. .................................... 364/580; 364/119; 364/551; 364/424; 123/479

[58] Field of Search ............... 364/580, 579, 900, 200, 364/119, 431, 551, 424; 371/62, 57; 123/32 EB

[56] References Cited

U.S. PATENT DOCUMENTS

| | | | |
|---|---|---|---|
| 3,659,087 | 4/1972 | Green et al. | 364/580 X |
| 3,868,647 | 2/1975 | Zandveld | 364/200 |
| 3,903,474 | 9/1975 | Wiley | 371/62 X |
| 4,064,747 | 12/1977 | Rackliffe et al. | 364/551 X |
| 4,072,852 | 2/1978 | Hogan et al. | 371/62 X |
| 4,099,495 | 7/1978 | Kiencke et al. | 123/32 EB |
| 4,117,317 | 9/1978 | Dooley, Jr. et al. | 364/119 X |
| 4,170,131 | 10/1979 | Gniewek | 364/551 X |
| 4,204,256 | 5/1980 | Klotzner | 364/431 |

*Primary Examiner*—Edward J. Wise
*Attorney, Agent, or Firm*—Frishauf, Holtz, Goodman & Woodward

[57] ABSTRACT

To supervise a program controlled device which is subject to stray noise or disturbance pulses, particularly microprocessor controlled automotive vehicle electronic systems, a timing circuit is provided responsive to check pulses added to the program and defining a timing interval, the monitoring system distinguishing between disturbance pulses and static defects by supervising the control pulses and, upon failure of the control pulses, generating a program restart or interrupt signal, respectively, which both initiate a new start of the program cycle or, respectively, define a timing interval which, upon failure to sense further control pulses, initiates energization of an emergency switching system. Continuous failure to receive control pulses also can initiate the emergency switching system. To permit start-up, and before control pulses are obtained, a time delay circuit is provided which disables the monitoring system upon switching ON of the program controlled device at least for the time period of one check pulse cycle.

21 Claims, 3 Drawing Figures

MONITORING SYSTEM FOR PROGRAM CONTROLLED APPARATUS

The present invention relates to a monitoring system for program controlled apparatus, and more particularly to a system in which a cyclical program controls the operation of devices or apparatus, typically the sequence of repetitive events in an automotive vehicle, such as fuel injection, ignition, or the like, and which monitors proper performance of the run-down of various program cycles.

BACKGROUND AND PRIOR ART

Program-controlled operation of repetitive events is well known. When applied to automotive vehicles, repetitive operations may, for example, be fuel injection or ignition timing pulses. U.S. Pat. No. 4,099,495, KIENCKE et al, assigned to the assignee of this application, discloses a control system for automotive vehicles, and more specifically an electronic control system to determine the timing of ignition pulses, fuel injection and the like, in which various signals appear which can be supervised or monitored for proper occurrence and function. U.S. Pat. No. 4,204,256, KLOTZNER, likewise assigned to the assignee of the present application, shows a program-controlled unit in which signals occurring therein can be used, directly, to obtain control or monitoring pulses. Various monitoring devices of program controlled apparatus have been proposed in order to monitor and supervise the proper sequencing of the programming steps. For example, it has been proposed to use test programs which are interspersed with the actual operating program in which the various functions of the program controlled apparatus are simulated. Depending on the type of the error signals or disturbance signals which are sensed, it is then possible to localize errors in the program. This type of monitoring is effective, but has the disadvantage that the program controlled system is not available for actual operation during the time that the test program is run, that is, the system is completely occupied by the test program. This is undesirable, particularly in such apparatus in which continuous processing of data is important. Use of test programs, therefore, in real-time control systems may lead to difficulties.

It has also been proposed to supervise program controlled apparatus by adding a control or check pulse to each sequence of pulses which occur during the program itself in order to show that the entire program is properly running. If such a control signal is used for continuous supervision of the apparatus, it is still possible that, if the control pulse is absent or lacking for only a short period of time, the entire apparatus is shut down.

It is disadvantageous that entire systems or apparatus are shut down in program controlled systems, particularly if the apparatus operates within an environment which is subject to substantial extraneous noise. Such conditions pertain particularly in automotive vehicle systems which use microprocessors, and especially in systems which are controlled by microprocessors. Automotive vehicles are particularly subject to stray noise pulses which are difficult to exclude—for example if the vehicle should pass close by a high-tension transmission line, adjacent an operative track system of electric railroads, or the like. It is particularly important that programs which control the operation of motor vehicles are operating under the programs as provided, for reasons of safety and operating efficiency. Monitoring systems must have devices which, upon recognizing malfunction, total loss, or interruption of the control of the vehicle, give an indication to the operator or trigger other apparatus in order to ensure safe operating condition of the vehicle, or which start an emergency program or an emergency function which permits at least some operation of the vehicle to a repair place or garage and which maintains those system functions which allow continued operation under safe conditions. Repair is costly for the user. It is thus necessary that monitoring systems shut down the actual program controlled apparatus only when it is absolutely necessary and to limit response of monitoring systems for those conditions in which the control system as such cannot function anymore at all. Loss of control pulses within a system is not a reliable indication, however, for complete failure of the control system since the excessive noise level in which the automotive electronic system operates frequently results in impression of short-time noise or blanking signals which may simulate substantial defects not actually caused by operating conditions. These spurious excess or blanking pulses may mask or cause loss of control pulses although they are not caused by actual breakdown of the control system as such.

THE INVENTION

It is an object to provide a monitoring system which is particularly suitable in automotive vehicles, or otherwise in surroundings subject to high noise levels, which permits testing of the system without, however, resulting in shut-down thereof if test signals fail for predetermined and short times.

Briefly, a monitoring system is provided which is responsive to receive check pulses which control the program generator or sequencing element and which resets the program generator or a counter to commence a new program cycle upon failure to sense occurrence of the monitoring or check pulse by the monitoring responsive element or circuit. In accordance with a feature of the invention, a continuously settable timing circuit, such as a monostable multivibrator, also referred to as a monoflop, defines a timing interval after receipt of a trigger pulse. The monoflop is connected to a signal furnishing arrangement or circuitry which, when the monoflop changes over, provides a pulse which is connected to a restart input of the program controlled apparatus in order to control restarting of the program which was interrupted by a failure of the check pulse. The timing of the timing interval can be so arranged that it is somewhat longer than the normal time of one program or check pulse recurrence cycle.

Each program cycle thus is monitored by checking the control or check pulse and, upon failure thereof, to generate an interrupt or restart signal, respectively, which causes a new programming cycle to occur, and which, for example, defines a timing interval which may also energize an emergency circuit or emergency control arrangement if several ones of the check pulses have failed.

The monitoring system has the advantage that any errors or malfunction within the program cycle can be differentiated from true failures of the entire system, particularly if the errors or malfunction are caused only by short-time or temporary interruptions. Thus, temporary interruptions can be distinguished from system failures. Upon system failure, however, emergency measures can be commanded, or their necessity indicated to the operator. A faulty or incorrect program cycle, which may be caused by a temporary malfunction or temporary error or a blanking pulse is, however, prevented from continuing since the programming device is reset to the program beginning for proper cycling and sequencing of the program.

Drawing, illustrating three examples:

Figure 1:
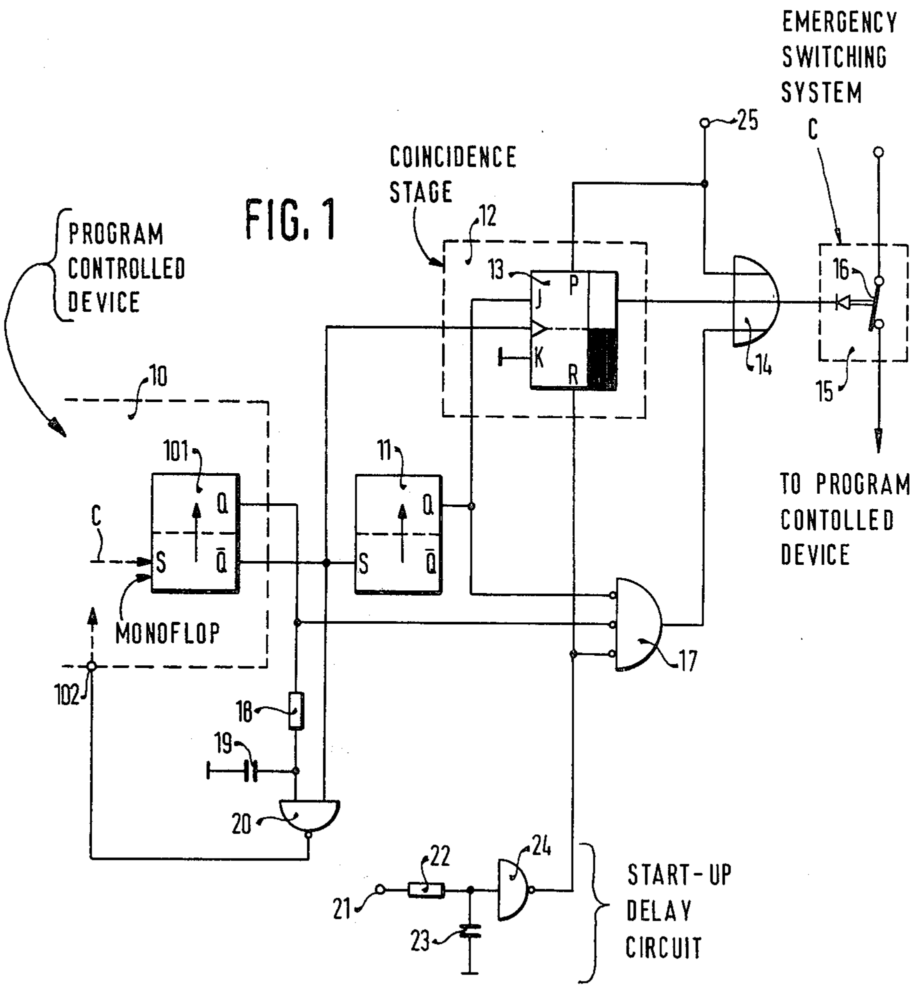
FIG. 1 is a schematic block circuit diagram of a first embodiment with restart triggering.

Embodiment of FIG. 1: A program controlled device 10, for example a system controlled by microprocessors of a motor vehicle, includes a monostable multivibrator, that is, a retriggerable monoflop 101. Such a monoflop has the characteristic to remain in SET condition if, during its unstable or timing period, further setting pulses appear. Each new setting pulse on check bus C starts a new timing interval, the timing interval being determined by the parameters of the monoflop itself, for example by a capacitor therein. Consequently, the monoflop will change state from the timing state to quiescent state only if the intervals between pulses applied to its SET terminal are longer than the timing interval determined thereby, that means, if during such a longer time no new SET pulse appears at its SET, that is, its S input. The inverting output $\overline{Q}$ of monoflop 101 is connected to the SET input S of a further monoflop 11 and also to the clock input of a JK flip-flop (FF) 13, which operates as a coincidence stage 12. The output of the JK-FF 13 is connected to an input of an OR-gate 14 which has its output connected to an emergency switching system 15. Emergency switching system 15 is illustrated, schematically and briefly only, as a normally closed switch 16. The J input of the JK-FF 13 is connected to the direct or Q output of the second monoflop 11. This output is further connected to an inverting input of an AND-gate 17. The AND-gate 17 has a further inverting input connected to the direct or Q output of monoflop 101. The direct output from the monoflop 101 is further connected to an R/C circuit 18, 19 and to an input of a NAND-gate 20, the second input of which is connected to the inverting output of monoflop 101. The output of NAND-gate 20 is connected to an input 102 forming a RESTART input of the program controlled device 10. Upon receipt of a pulse at the RESTART terminal 102, the program controlled device is commanded to restart a program cycle. For example, if the program controlled device cyclically computes the ignition timing instant for sequential ignition pulses from spark plugs in an automotive vehicle, a pulse at the RESTART terminal 102 will command initiation of a new computation cycle or sequence. A timing circuit formed by the R/C network 22, 23 is connected to a supply terminal 21 which supplies power to the entire monitoring system. The output of the R/C circuit 22, 23 is connected to an inverter 24, the output of which is connected to a third inverting input of the AND-gate 17 as well as to the RESET input of the JK-FF 13. A third input of the OR-gate 14 is connected to a terminal 25.

Operation: The input to the SET terminal S of the monoflop 101 is derived from control pulses which are included in the program which controls the program controlled device 10. In ordinary, proper operation, at least one control pulse is applied to the S input of monoflop 101. The timing period of monoflop 101 is so selected that it is longer than the cycling time between control pulses. If the program, therefore, properly continues, then the control pulses applied to the monoflop 101 will continuously start new timing intervals so that monoflop 101 will continuously remain in SET condition.

The Q or direct output of the monoflop 101 will have a positive or logic 1-signal thereon if the monoflop 101 is in SET condition, that is, if the program is proceding properly. Consequently, the inverting $\overline{Q}$ output continuously will have a logic 0.

Let it be assumed that, due to noise or other interference, a control pulse will fail, then the monoflop 101 will drop out or reset. The inverting $\overline{Q}$ will have a logic 1. This controls the clock input of the JK-FF 13 and the second monoflop 11 will be SET. The monoflop 11, of course, has an inherent switching delay so that a logic 1-signal will appear at the output of the monoflop 11 only after the logic 1-signal appeared at its S or SET input. The JK-FF 13 thus will not be set at the time of the output from the monoflop 101 but only a little later. The timing interval of the monoflop 11 is selected to be substantially longer than that of the monoflop 101. Typical timing intervals are:

cycling time of control pulses: 8 milliseconds;
timing interval for monoflop 101: 12 ms;
timing interval for monoflop 11: 50 ms. When the monoflop 101 resets, the R/C circuit 18, 19 will provide a differentiated or needle pulse to the NAND-gate 20 which is transferred to the RESTART input 102 of the program control device 10. Thus, whenever the monoflop 101 resets, a new start of the program cycle will occur. If the program, upon the next cycle, is carried out without interruption or disturbance, a pulse will be applied to the S input of monoflop 101 which will SET, and further operating cycles can proceed as desired. If, however, the next subsequent control pulse also is missing or disturbed during the timing interval of the second monoflop 11—for example 50 ms—then the inverting $\overline{Q}$ output of monoflop 101 will provide a pulse to the trigger input of the JK-FF 13 which will change state. The OR-gate 15 will be enabled and the emergency switching system 15 energized, for example by controlling switch 16 to interrupt current supply to the program control device 10 by opening of switch 16.

In case of serious malfunction, for example, the situation may occur that even after renewed start of the program upon triggering of the RESTART terminal 102, no further control pulses will be received by the monoflop 101. In that case, the Q output of monoflop 101 will remain statically at logic 0, the Q output of monoflop 11 will, however, after its timing interval, also revert to zero. Ignoring, for the time being, the third input to the AND-gate 17, the AND-gate 17 will then become conductive and will, through its connection to the OR-gate 14, likewise trigger the emergency switching system 15, as before.

If the first failure to sense a control pulse at the S input of monoflop 101 within its timing interval is only a passing disturbance, and further control pulses do arrive at the monoflop 101 during the timing interval of the second monoflop 11, then both inputs of the JK-FF 13 will have a 0 logic signal thereon. Thus, the JK-FF 13 will not change state and the two first inputs of the AND-gate 17 will have, respectively, a 0-signal and a 1-signal thereon, so that the coincidence conditions of the AND-gate 17 are not satisfied, and the AND-gate 17 will not deliver a trigger signal to the emergency switching system 15, 16 through the OR-gate 14. The monitoring system, which was SET by failure of the first control pulse, thus is self-deactivated after the timing interval of the second monoflop 11 has elapsed.

Terminal 25 is provided in order to permit introduction of a signal derived externally, for example based on other criteria, generated manually, or the like, which is applied to a further input of the OR-gate 14 and/or the PRESET input P of the JK-FF 13. The circuit 22, 23, 24 is provided in order to prevent response of the program controlled device 10 when the system is first energized. Supply voltage is applied to terminal 21 and, upon energizing terminal 21, the timing circuit formed by R/C circuit 22, 23 and the inverter 24 provides a short-time positive logic signal which controls the JK-FF 13 over the RESET input R so that it cannot be controlled by any other input, and thus cannot change state. Further, the inverting input applied to the AND-gate 17 ensures that the AND-gate 17 cannot become conductive during the turn-on phase of the system. After some time, determined by the R/C circuit 22, 23, the signal at the output of the inverter 24 will become a logic 0 and the monitoring system can function as described above.

Figure 2:
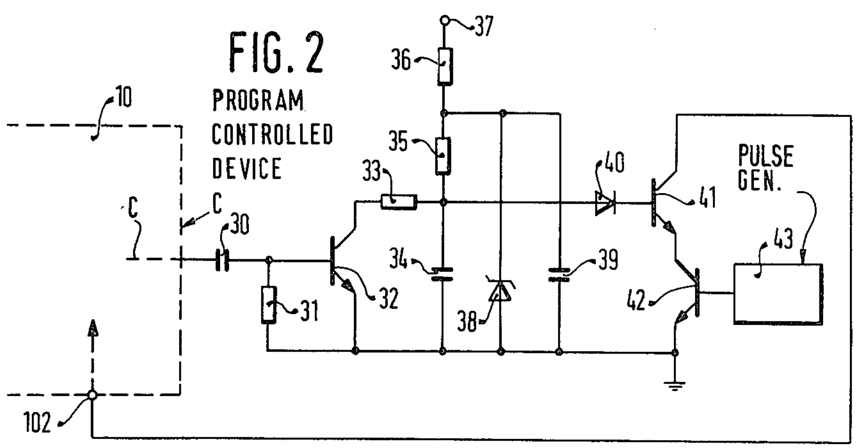
FIG. 2 is a fragmentary circuit diagram of a second embodiment with restart triggering.

Embodiment of FIG. 2: FIG. 2 is a circuit diagram of a RESTART circuit which can be used in the monitoring system according to an embodiment of the invention. An output of the program controlled device 10, which carries control pulses symbolized by a line C (see also FIG. 1) is connected to a differentiator formed by a capacitor 13 and a resistor 31 which is connected to the base of a transistor 32. The collector of transistor 32 is connected over resistor 33 to a timing R/C circuit formed by capacitor 34 and resistor 35. This timing circuit is serially connected with a resistor 36 to a supply source, for example a voltage controlled reference supply. The series circuit of capacitor 34 and resistor 35 is bridged by a Zener diode 38 and a capacitor 39. The junction between capacitor 34 and resistor 35 is connected over diode 40 to the base of the transistor 41 which has its main conductive path connected through the conductive path of a transistor 42 to ground or chassis. The collector of transistor 41 is connected to the RESET terminal 102 of the program controlled device 10. The base of transistor 42 is connected to a pulse generator 43 which, for example, may be a reference pulse generator providing reference pulses, cyclically, in synchronism with the rotation of the crankshaft of an internal combustion engine, for example an automotive internal combustion engine, in which the program controlled device provides computed timing pulses for the ignition or for fuel injection of the engine.

Operation, circuit of FIG. 2: In ordinary operation, cyclically periodically occurring control pulses of the program controlled device are connected from line C through the differentiators 30, 31 and, as differentiated, are connected to the base of transistor 32 which is periodically rendered conductive. Conduction of the transistor 32, periodically, discharges the capacitor 34 which is charged from a reference voltage applied to terminal 37 while the transistor 32 is blocked. In proper, ordinary operation, the capacitor voltage will never exceed a predetermined reference level. In order to protect the R/C circuit 34, 35 against disturbance, noise or interference, resistor 36 is provided, as well as Zener diode 38 and capacitor 39. The voltage which will build up on capacitor 34 is transferred over diode 40 to the base of the transistor 41.

In ordinary, proper operation of the program controlled device 10, transistor 41 will remain blocked. If, however, a control pulse at line C is missing, the voltage at the capacitor 34 will rise since transistor 32 will no longer provide for discharge of capacitor 34, and capacitor 34 can charge to a higher level. This causes transistor 41 to become conductive. A short, negative pulse at the RESTART input 102 of the device 10 is required in order to provide for restarting of the program. In a motor vehicle, this can be obtained by transferring a pulse from signal generator 43 to the RESTART terminal 102 through transistor 42. If the transistor 41 is conductive, due to failure of a control pulse, and the transistor 42 is rendered conductive upon receiving a pulse from pulse generator 43, the restart input 102 will be connected to ground or chassis or reference voltage for a short interval, similar to a pulse, thus restarting the program for the program controlled device to recycle.

The pulse generator 43 can be constructed in various ways; for an automotive vehicle, it can be coupled to the crankshaft or another rotating portion of the engine; in other devices, it can provide, cyclically, recurring pulses, at a fixed periodic rate or in dependence on the operation of the program controlled device, for example its speed. The pulse generator 43 may also be constructed in the form of an astable multivibrator so that, after a single control pulse at the line C has failed, numerous rapidly recurring pulses are supplied from the generator 43 to the RESTART input 102. The program is repetitively reset until a proper program cycle is obtained, that is, the line C is energized, thus discharging the capacitor 34 upon conduction of the transistor 32.

Figure 3:
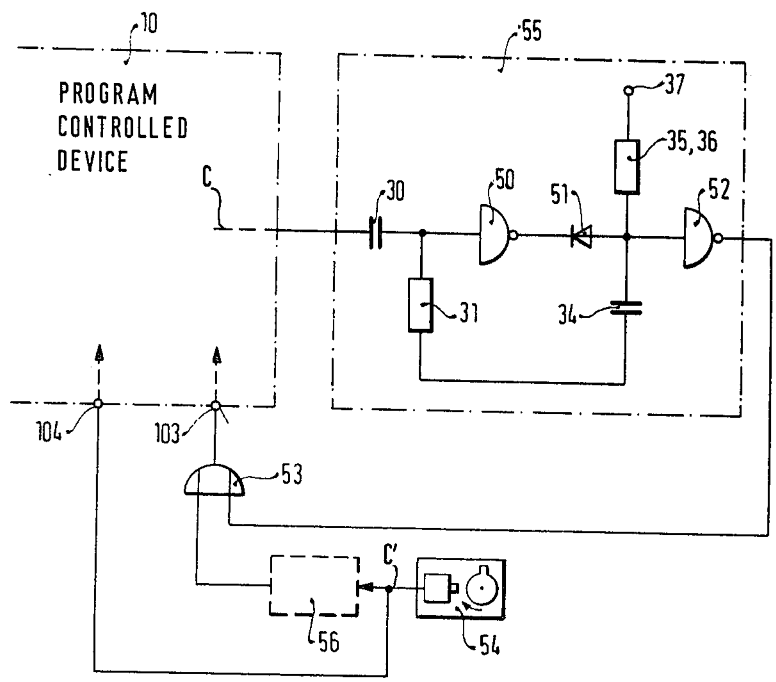
FIG. 3 is a schematic circuit diagram of a third embodiment with interrupt triggering.

Embodiment of FIG. 3: Control or check pulses which arise during the run of the program of the program controlled device are applied over line C, as in the examples illustrated and described with reference to FIGS. 1 and 2, and are applied over the coupling capacitor 30 connected to a resistor 31 to the control input of a retriggerable timing circuit. The timing circuit includes capacitor 34, resistors 35, 36 connected to a source of reference voltage 37, an inverter 50 and a diode 51. During occurrence of a short control signal, the output of the inverter 50 will have a 0-signal thereon so that capacitor 34 can discharge over diode 51. In a subsequent timing interval, capacitor 34 will charge over the resistors 35, 36, until the capacitor 34 can again discharge upon occurrence of a subsequent control pulse on line C. The dimensioning of the elements is so arranged that, in ordinary operation, the capacitor voltage of the capacitor 34 is always below the response level of the inverter 52. The output of the inverter 52 thus will, continuously, have a 1-signal appear thereon. If a control signal is missing, capacitor 34 will charge to a higher level and will exceed the response threshold of the inverter 52. The inverter 52 will have a 0-signal at its output which is connected to the interrupt terminal 103 of the program controlled device 10. The program controlled device 10, as is customary in many such apparatus, has an interrogation cycle, and the interrupt input 103 is cyclically interrogated to determine if a 1-signal is present at the terminal 103. The interrogation can be in regular intervals, or irregularly, depending on the importance of program steps being carried out, or their length, and arranged in accordance with the program of the system as a whole. The associated program step can be so arranged that, if terminal 103 has a 1-signal thereon, the program continues regularly to the next program step. If, however, a 0-signal is sensed, the program is interrupted and will suddenly jump to initiation of the program, that is, will commence a new cycle from its beginning. This monitoring arrangement permits supervision of the program with less external constructional elements so that the program can be essentially self-monitoring and, upon sensing of disturbances, a new program cycle can be initiated.

Resetting the program, that is, practically resetting a program step counter to its beginning, can also be triggered if a cyclically recurring reference marker signal fails, which can be due to defects in the reference marker signal generator, or that the generator is stopped. Circuit 56, which corresponds essentially to the totality of the elements within the chain-dotted box 55, is connected to a reference marker signal generator 54, for example an inductive generator, coupled to the shaft of an internal combustion engine and which provides repetitively recurring pulses upon rotation of the shaft. The output of this generator 54, available at terminal C′, is then connected to a circuit similar to circuit 55, in which the terminal C′ corresponds to the line C connected to the network 55. If a reference marker signal is missing, the circuit 56 will provide a signal through the OR-gate 53 to the interrupt terminal 103, with the same consequence as if a program check signal were missing on line C.

The marker generator 54 is additionally connected to a terminal 104 of the program controlled device 10 to control cycling of the program, for example in synchronism with rotation of the shaft of the engine. Wave shaping circuits, buffers, and the like, which are customary and standard in the Art, have been omitted from the drawing for clarity.

Various changes and modifications may be made, and features described in connection with any one of the embodiments may be used with any of the others, within the scope of the inventive concept. For example, the network including the coincidence stage 12, the second monoflop 11, and the emergency switching system 15, 16 can be used also with the embodiment of FIG. 2 or 3; the pulse generator 43 (FIG. 2) can be similar to the marker pulse generator 54 of FIG. 3 or can be in the form of a clock generator, for example an astable multivibrator. Likewise, the start circuit 21, 22, 23, 24 with the appropriate input to the gate 17 (FIG. 1) can be used with the other embodiments, or modifications thereof.

We claim:

1. Monitoring system for a program controlled device for operating systems in an automotive vehicle, the automotive vehicle having electronically program controlled devices which repetitively, cyclically control and cause operating events for the engine of the vehicle including at least one of ignition and fuel injection, in which the program control is effected by electrical program signals having characteristics defining the program, and said signals are subject to spurious noise and erroneous disturbance signals occurring in an automotive vehicle in which the program controlled signals include cyclically recurring signal sequences which further include supervisory or monitoring check pulses, said program controlled device (10) having a check pulse line or bus (C) on which the monitoring or check pulses appear, and said program controlled device controlling the repetitive occurrence of said at least one event, comprising, in accordance with the invention, a source of operating power for the program controlled device, monitor means connected to said check pulse line or bus (C) and sensing regular recurrence of said check pulse, said monitor means being connected to and controlling the program controlled device to reset the program and commence a new program cycle upon failure to sense occurrence of the monitor or check pulse by said monitor means subsequent to a previously sensed check pulse, and an emergency switching system (15, 16) coupling said operating power source to the program controlled device and having an input which, when energized, causes said emergency switching system to disconnect the operating power source from the program controlled device to disable the program controlled device.

2. System according to claim 1, wherein said monitor means includes a timing circuit (101; 32, 33, 34) which has a timing interval longer than the longest recurrence time of said check pulses on the check pulse bus (C), but shorter than a predetermined number of recurrence times of said check pulses.

3. System according to claim 2, wherein said timing circuit comprises a triggerable timing circuit initiating the timing interval upon sensing a check pulse on said check pulse line or bus (C), said triggerable timing circuit being connected to and controlling the program controlled device to commence a new program cycle upon failure to continuously remain in the timing interval maintenance state.

4. System according to claim 3, wherein said timing circuit comprises a retriggerable monoflop (101).

5. System according to claim 2, further including check or monitor pulse counting means (11) connected to and controlled by said check pulse line or bus (C);

and coincidence means (12, 13) connected to said timing circuit and to said check pulse counting means and providing an enabling signal to said emergency switching system input if a predetermined number of check or monitor pulses do not occur.

6. System according to claim 5, wherein said check pulse counting means (11) comprises a second timing circuit (11) which has a timing interval which is long with respect to the timing interval of said first timing circuit (101).

7. System according to claim 5, wherein the coincidence stage (12, 13), the timing circuit (101) and the pulse counting means (11) are so interconnected that the coincidence stage (12) will provide an output if a predetermined number of check pulses are not counted by the check pulse counting means (11), and said timing circuit (101) is in a state which defines said timing interval, to energize said emergency switching system input if the timing circuit (101) should be defective, or have been spuriously triggered and, additionally, there is a failure to count said predetermined number of check pulses.

8. System according to claim 7, wherein the timing circuit (101) has an inverting output; and the check pulse counting means (11) comprises a monoflop (11) and the coincidence stage comprises a JK flip-flop (FF) (13);

the J input being connected to the output of the further monoflop (11), the K input being connected to a reference, and the output being connected to the emergency switching system (15).

9. System according to claim 8, wherein the timing interval determined by the further monoflop (11) is long with respect to the timing interval of said first timing circuit (101).

10. System according to claim 8, further including an AND-gate (17) having the outputs of the timing circuits connected to inverting inputs thereof, the output of the AND-gate being further connected to the emergency switching system to energize said emergency switching system in case of failure of said timing circuit (101) or said check pulse counting means (11).

11. System according to claim 2, wherein said timing circuit comprises means (35, 36, 37, 38, 39) providing a reference voltage;

a capacitor (34) charged by the reference voltage, and controlled switch (32) repetitively discharging the capacitor under control of said check pulses, and connected to said check pulse line or bus (C);

and circuit means (40, 41, 42, 43; 52, 53) controlled by the voltage level of said capacitor connected to said program controlled device (10) to start a new program cycle if the voltage of said capacitor exceeds a predetermined threshold level.

12. System according to claim 11, wherein said circuit means include a trigger pulse generator (43) and switching means (41) responsive to the voltage level across said capacitor and applying the trigger pulses by said pulse generator to a "RESTART" terminal (102) of said program controlled device (10) to initiate a new program cycle.

13. System according to claim 11, wherein said program controlled device (10) has an "interrupt" input (103) which, upon change of a signal thereon, causes interruption of an ongoing program and restarting of the program from its initiation;

and wherein said circuit means include a connection (52, 53) changing the signal level on said "interrupt" terminal (103) to command restarting of the program.

14. System according to claim 13, further including a reference pulse signal generator (54) and a timing circuit (56) connected to the reference pulse generator and, under normal operation of said pulse generator, providing a voltage level to said "interrupt" terminal (103) indicative of normal operation, but providing a signal to said "interrupt" terminal to effect restart of the program by the program controlled device upon failure of pulses from said generator.

15. System according to claim 2, further including a pulse generator (43, 54) connected to the engine of the vehicle and providing pulses in synchronism with the rotation of the engine, said pulses controlling the cycling of said program and the occurrence of said events with respect to the instantaneous angular position of the shaft of the engine of the vehicle.

16. System according to claim 1, wherein said program controlled device includes a "RESTART" terminal (102) which, when energized by a trigger pulse, restarts a program cycle;

and wherein said monitor means includes a signal furnishing network (18, 19, 20; 41, 42, 43) which, upon failure to sense occurrence of a monitor or check pulse on said check pulse bus, provides a trigger pulse to the RESTART input (102) of the program controlled device to initiate a new program cycle.

17. System according to claim 16, wherein said monitor means includes a timing circuit (101; 32, 33, 34) which has a timing interval longer than the longest recurrence time of said check pulses on the check pulse bus (C), but shorter than twice the recurrence time of said check pulses;

and wherein said timing circuit is connected to said signal furnishing network.

18. System according to claim 16, wherein said signal furnishing network includes a pulse generator (43, 54) providing periodically recurring pulses.

19. System according to claim 18, wherein said pulse generator comprises a reference marker or reference pulse generator (54).

20. System according to claim 18, wherein said pulse generator comprises an astable multivibrator (43).

21. System according to claim 1, further including an energization override circuit (22, 23, 24) including a timing circuit connected to the source of operating power, and connected to the emergency switching system to disable operation of the emergency switching system for an initial timing interval longer than the time for occurrence of a first check pulse to prevent response of the emergency switching system until the monitor means responsive to the check pulse could have sensed a check pulse.

* * * * *